Patented May 18, 1926.

1,585,434

UNITED STATES PATENT OFFICE.

NATHAN SULZBERGER, OF NEW YORK, N. Y.

NONODOROUS PHENOLATED SOAP.

No Drawing. Application filed March 15, 1923. Serial No. 625,414.

The derivatives of carbolic acid and other phenols (and phenol-derivatives) with higher acids, containing more than eleven atoms of carbon, have little or practically no phenol-odor at all, particularly, the phenol-esters of such fatty acids, as palmitic, stearic and oleic (and their mixtures), as occur in animal and vegetable fats and oils. This lack of odor, coupled with their freedom from irritating effect, which the free phenols possess, has made them very valuable as antiseptic constituents, in salves and ointments, as described in my Patent No. 938,614 of 1909.

I have now found that these phenol-esters may also be embodied in soaps for various uses, the alkalinity of the same, if acting at all, not producing reactions causing the objectional odor of the free phenol to return. The value of imparting the antiseptic properties of phenols (carbolic acid, o-, m- and p-cresol, p-chlor-m-cresol, xylenol-, etc.) to soaps, particularly, where an antiseptic action is desired is self-evident and has, heretofore, been well recognized, but, for the reason of the objectionable properties of the free phenols, as to odor and irritating effect on the skin, has never found broad application. By using in soaps the above-named phenol-compounds, these objections are readily overcome. Furthermore, the same will, in most cases, much better mix with the soapy material and also have greater affinity for the skin, than the free phenols.

As an example of my invention, I, herewith, describe a shaving cream. Any ordinary shaving cream is mixed with about 3% of melted phenyl-stearate. When the product has been well stirred in, the cream is ready for use. A white cream, aromatized with any flavor desired, can be obtained, which is free from the carbolic acid odor and absolutely non-irritant to the skin. The product foams well and is most readily taken by the skin, so that a closer shave is possible, the latter evidently due to the fat-like nature of the phenyl-stearate it contains. Amounts and nature of the phenol-compound as, for example, various phenol-esters, cresol-esters etc. of stearic, oleic, palmitic and other saturated and unsaturated acids forming such phenol-esters and having more than twelve atoms of carbon, principally, including also those acids as occur in the natural fats and oils, may be variously modified, as well as method of preparation. Additions of perfumes, medicaments (borax, lanolin, etc.) may be made. The antiseptic property of a shaving cream is particularly valuable, as the danger from infections from cuts and instruments is always present. The healing-effect due to its phenol-compound, which is finely divided and spread over the skin in the soapy ingredients, which also tend to allay the bleeding, in case of a cut, coupled with the pain-allaying and soothing action of such phenol, make such additions particularly desirable in a shaving-cream and soap. If a more powerful bleeding stop is required, a small amount of a styptic may be incorporated in the preparation. Examples of suitable styptics for this purpose are adrenalin or epinephrin, hæmolytic ferments and thromboplastine.

Soaps, both solid, creamy and liquid are readily used in conjunction with the above-named phenol-compounds. Oleic-acid-phenol-esters are indicated, where a liquid (lysol-like, etc.) soapy material, possessing antiseptic properties is desirable. Color may be added. In most cases, it will be necessary to simply add the phenol-ester etc. to the soap-stock in a liquid (just melted) condition, best, at a temperature as low as possible to allow thorough mixing and even distribution. Mixtures of phenol-compounds may also be used. Other ingredients used in soaps (shaving soaps, etc.) may be added.

The term: "phenol-ester" used in the following claims designates the product of reaction between the organic acid (acids) and the phenol (phenols) coming under the scope of this invention, in its pure form and or in mixture, as the case may be.

Throughout the claims the expression "a shaving preparation containing soap" is used to include shaving preparations of various consistencies, e. g. solid soap, paste, etc.

I claim:—

1. A soap containing a phenol-ester of an organic fatty acid having more than eleven carbon atoms.

2. A soap containing a phenol-ester of an organic fatty acid having more than eleven carbon atoms, the ester being in a substantially pure state and the product being substantially free from the odor of the free phenol.

3. A soap containing phenyl-stearate.

4. A shaving preparation containing soap, a phenol-ester of an organic fatty acid having more than eleven carbon atoms and adrenalin.

5. A shaving preparation containing soap, phenyl-stearate and a styptic.

6. A shaving preparation containing soap, phenyl-stearate and adrenalin.

NATHAN SULZBERGER.